Figure 1:
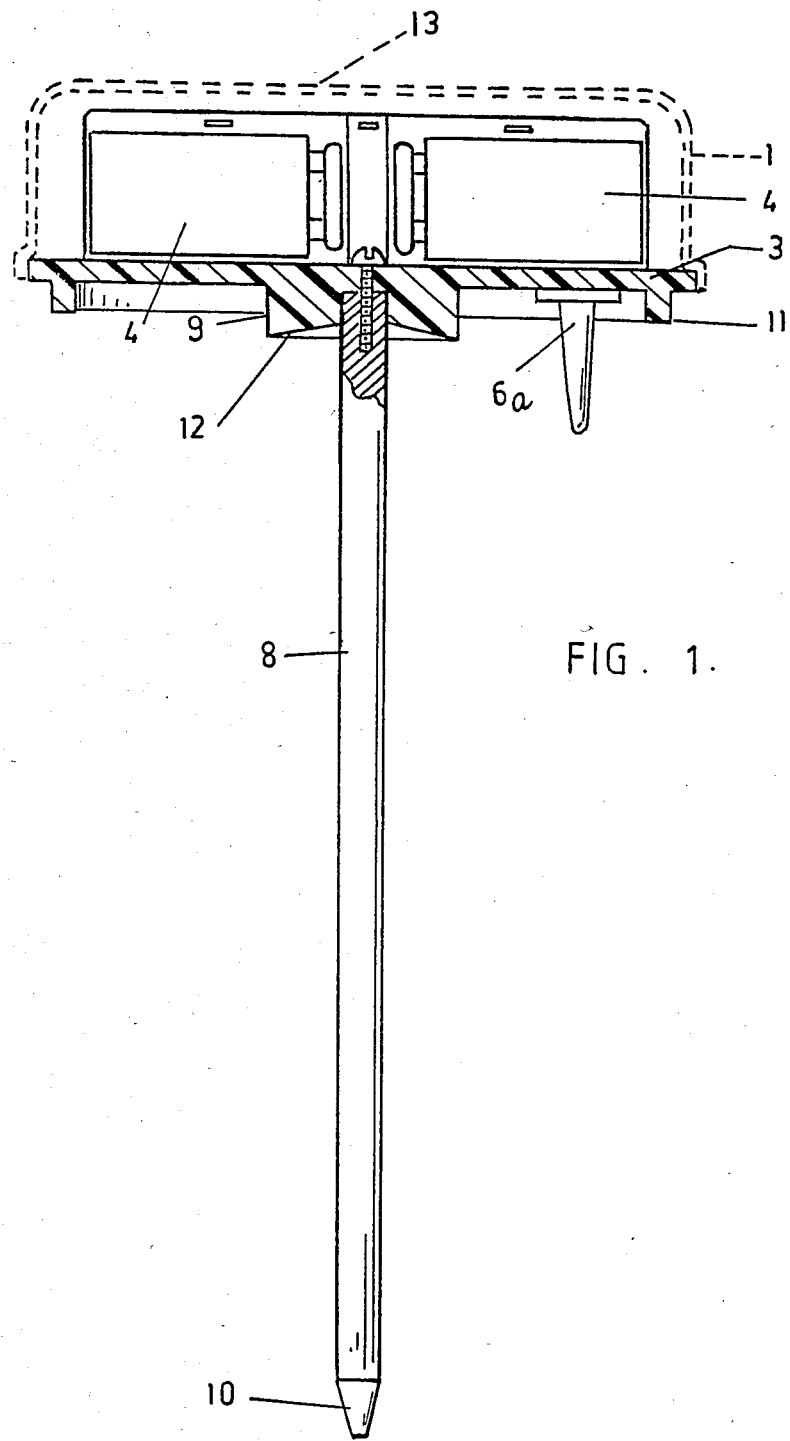

United States Patent [19]

Palmer

[11] Patent Number: 4,630,571
[45] Date of Patent: Dec. 23, 1986

[54] DEVICE TO REACTION TRAIN ANIMALS

[76] Inventor: Robert S. Palmer, 20 Dolly Avenue, Gosford, New South Wales, 2250, Australia

[21] Appl. No.: 781,689

[22] Filed: Sep. 30, 1985

[51] Int. Cl.⁴ ............................................. A01K 15/02
[52] U.S. Cl. ........................................ 119/29; 47/1.3; 43/98
[58] Field of Search ................ 119/29, 121; 43/1, 98; 174/6, 7; 47/1.3; 231/7

[56] References Cited

U.S. PATENT DOCUMENTS

| 565,384 | 8/1896 | Fuchs | 47/58 X |
| 922,377 | 5/1909 | Ames | 43/98 |
| 3,793,770 | 2/1974 | Johnson | 47/1.3 |
| 3,973,354 | 8/1976 | Schommer | 47/1.3 |

*Primary Examiner*—Robert P. Swiatek

[57] ABSTRACT

A device to reaction train animals to avoid an area where the device is located. The device comprising a housing in which there are batteries connected between a conductive housing cover and a conductive earthing post through a switch. The earthing post projects from the underside of the housing and lies within a continuous moisture barrier projecting from the underside of the housing to interrupt a direct moisture path between the cover and the earthing post.

3 Claims, 3 Drawing Figures

DEVICE TO REACTION TRAIN ANIMALS

This invention relates to a device to reaction train animals to avoid an area where the device is located.

The purpose of the device is to provide an investigating animal or bird with an unpleasant experience which will be registered in the memory of the animal or bird and will be associated with the appearance or some other feature of the device, e.g. an odour. In this way the animal or bird will be reaction trained to avoid the device and if the device is strategically placed, as for example adjacent a gateway, it will deter an animal from entering the area to which the gateway gives access.

Whilst the initial unpleasant experience suffered by the animal will involve the animal actually touching the device it is believed that subsequently the appearance of the device will be sufficient to deter the animal and to that extent the device will have a "scarecrow" effect on animals or birds.

The device can be generally said to comprise a source of electrical energy which will be earthed through the animal or bird when the animal or bird touches the device and is itself earthed. The result is a mild electrical shock which provides the unpleasant experience referred to above.

More specifically, the invention provides a device to reaction train animals to avoid an area where the device is located, the device comprising a housing body made of electrically non-conductive material, a housing cover made of electrically conductive material mounted over the body to provide a watertight compartment therebetween, dry cell battery mounting means in the compartment having positive and negative terminals, an electrically conductive contact fixed to the housing body within the compartment and engaged by the housing cover, an electrically conductive earthing post fixed to and projecting from the underside of the housing body, a switch mounted in the compartment, an operating member to connect and disconnect two terminals of the switch, an electrical connection between one terminal of the battery mounting means and one terminal of the switch means, a second electrical connection between the other terminal of the battery mounting means and the earthing post and a third electrical connection between the contact engaged by the housing cover part and the second terminal of the switch means, and a continuous moisture barrier means projecting from the underside of the housing body and encircling the earthing post ro interrupt a direct moisture path between the housing cover and the earthing post.

Figure 2:
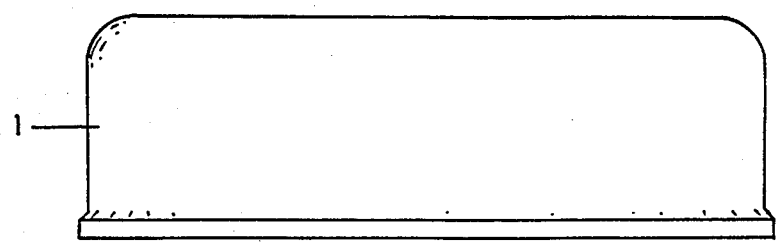
Figure 3:
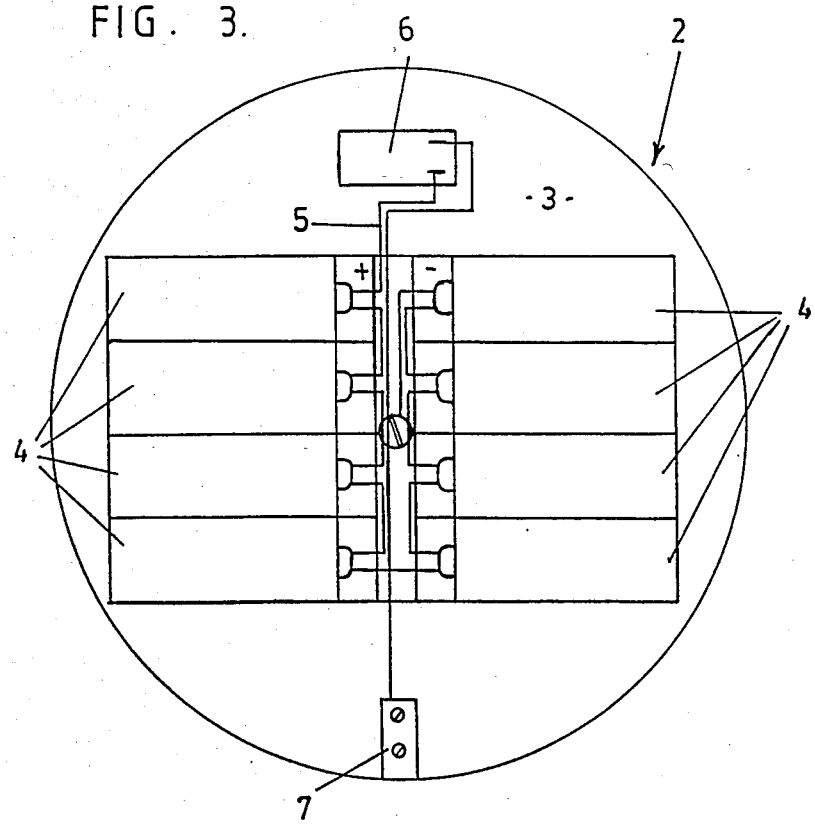

A preferred embodiment of the invention will now be described with reference to the accompanying drawings in which:

FIG. 1 is a cross-sectional elevation of the device of the invention with the cover removed, FIG. 2 is a side elevation of the cover for the device, and FIG. 3 is a plan view showing the upper face of the body of the device with batteries mounted thereon.

Referring to the drawings, the device comprises an electrically conductive cover 1, see FIG. 2 and the dotted outline of part of the cover in FIG. 1, which overlies the body part 2 of the device. The body part 2 is made of insulation material and is circular (see FIG. 3) and on the upper surface 3 of the body part 2 there is shown mounted eight dry cell batteries 4.

The batteries 4 are interconnected in series with the positive lead 5 from the battery array connected to one pole of a switch 6. The other pole of the switch 6 is connected to a contact plate 7 fixed to the upper surface 3 of the body part 2. It will be noted that the operating lever 6a for the switch 6 extends below the underface of the body part 2.

The negative lead from the battery array is connected to a post 8 fixed at one end in a boss 9 on the underface of the body part 2. The post 8 is made of metal and has its other end sharpened at 10 to facilitate the penetration of the earth by the post 8.

There is a continuous rib 11 on the underface of the body part 2. The purpose of the rib 11 is to prevent water tracking from the cover directly to the switch 6 and the post 8 thereby creating an electrical short circuit condition from the negative polarity cover 1 to the positive polarity post 8. It will be noted that a supplementary water path barrier is provided by the angled face 12 of the boss 9.

It will be seen that the upper face 13 of the cover 1 will be in a plane at right angles to the long axis of the post 8 when the device is assembled and mounted in the earth thereby providing an area upon which an animal lure can be supported. It is envisaged that under some circumstances a lure will not be required and natural animal curiosity will result in the nose or tongue of an animal coming into contact with the cover 1 with the resultant earthing of the device through the animal and the animal thereby receiving a mild electrical shock.

The foregoing is only one embodiment of the invention and variations can be made in accordance with requirements. For example, the batteries can be held in place by a preformed battery holder with contacts and wiring thereby facilitating the mounting of the batteries and the connection thereof into the required circuit arrangement.

I claim:

1. A device to reaction train animals to avoid an area where the device is located, the device comprising a housing body made of electrically non-conductive material, a housing cover made of electrically conductive material mounted over the body to provide a watertight compartment therebetween, dry cell battery mounting means in the compartment having positive and negative terminals, an electrically conductive contact fixed to the housing body within the compartment and engaged by the housing cover, an electrically conductive earthing post fixed to and projecting from the underside of the housing body, a switch mounted in the compartment, an operating member to connect and disconnect two terminals of the switch, an electrical connection between one terminal of the battery mounting means and one terminal of the switch means, a second electrical connection between the other terminal of the battery mounting means and the earthing post and a third electrical connection between the contact engaged by the housing cover part and the second terminal of the switch means, and a continuous moisture barrier means projecting from the underside of the housing body and encircling the earthing post to interrupt a direct moisture path between the housing cover and the earthing post.

2. A device as claimed in claim 1 including a switch operating member projecting from the underside of the housing body and lying within the continuous moisture barrier.

3. A device as claimed in claim 1 including a boss on the underside of the housing body and within the continuous moisture barrier, a recessed lower face on the boss with earthing post extending from within the recess.

* * * * *